Figure 1:
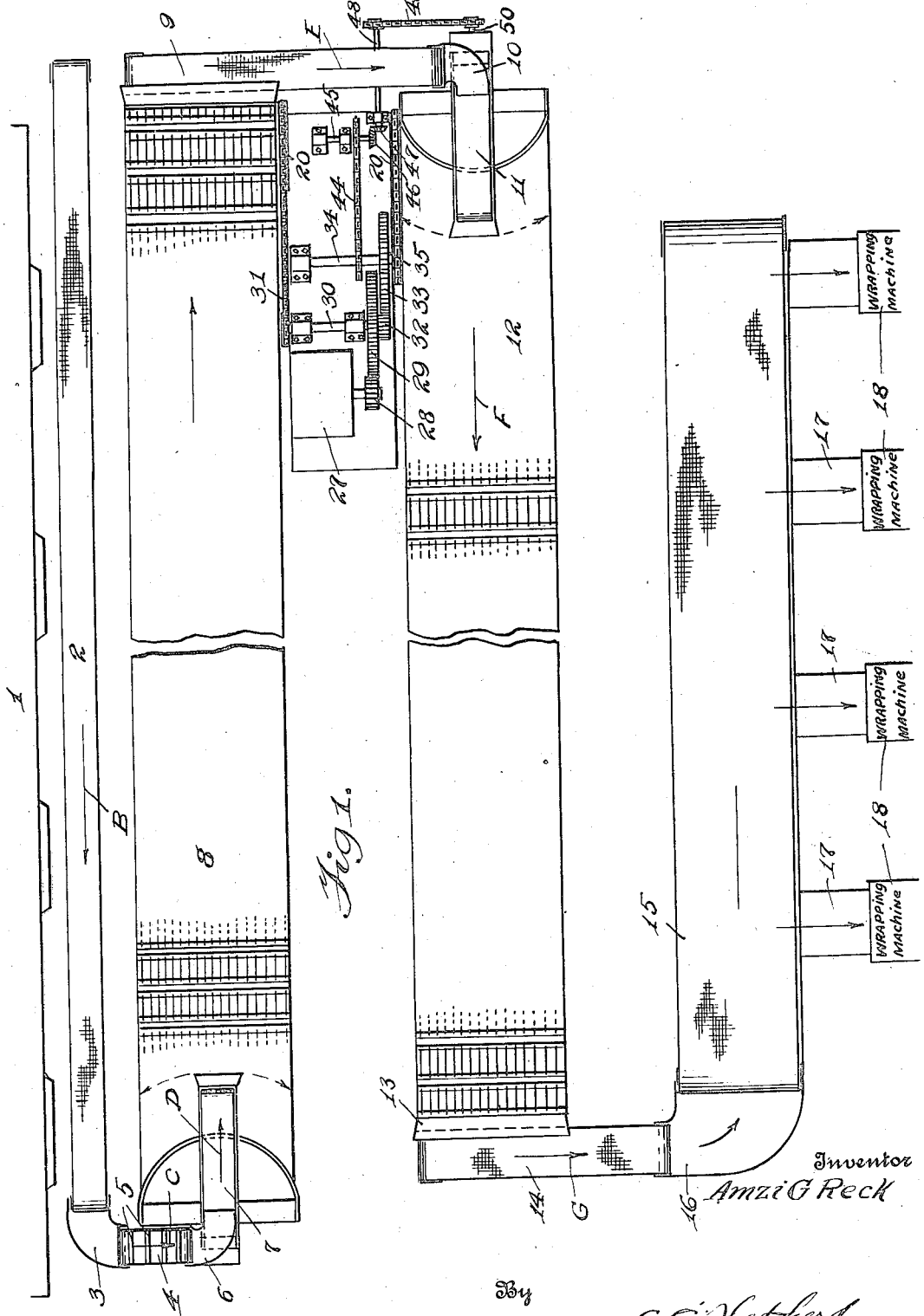

May 29, 1923.

A. G. RECK 1,456,715

CONVEYING MECHANISM

Filed July 3, 1919

3 Sheets-Sheet 1

Inventor
Amzi G Reck

By
C. C. Shepherd Attorney

May 29, 1923.
A. G. RECK
1,456,715
CONVEYING MECHANISM
Filed July 3, 1919
3 Sheets-Sheet 2
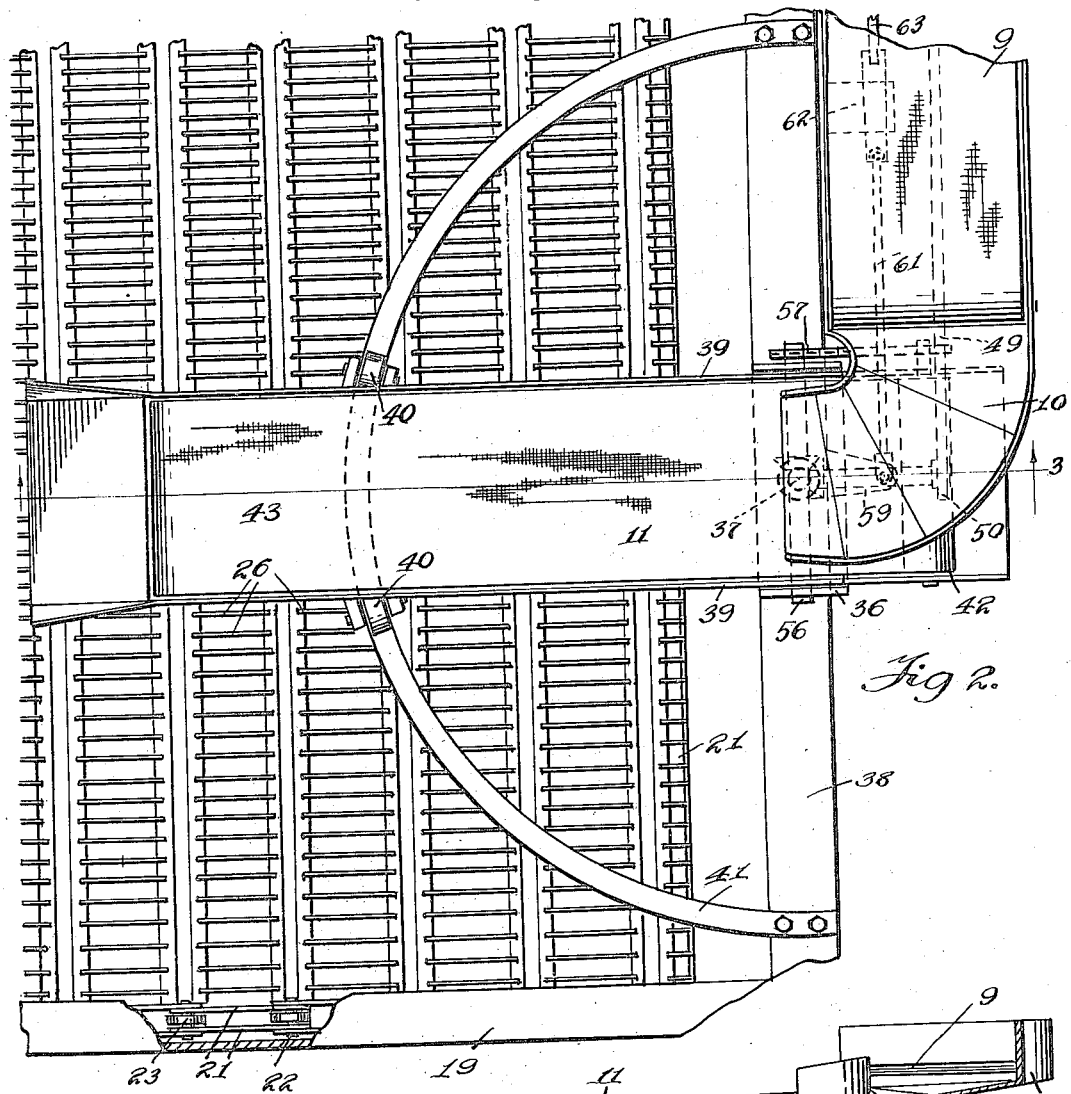

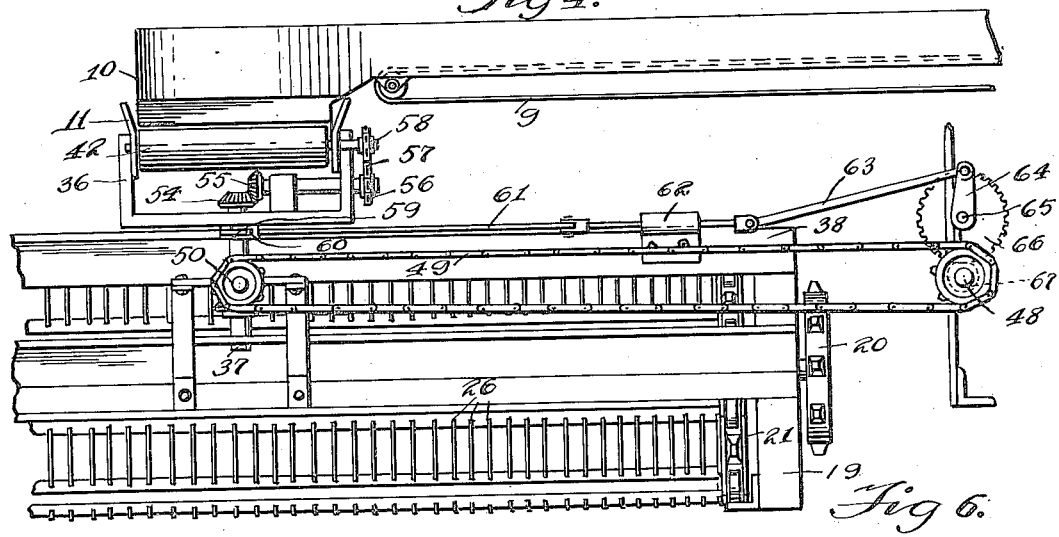
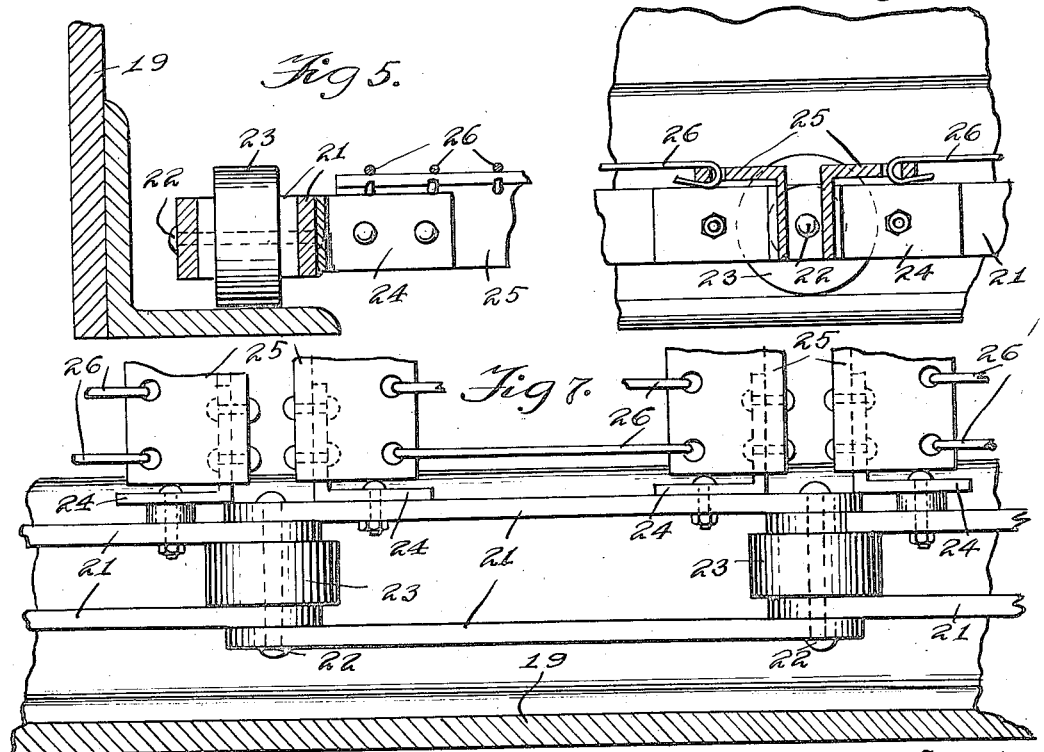

Patented May 29, 1923.

1,456,715

UNITED STATES PATENT OFFICE.

AMZI G. RECK, OF COLUMBUS, OHIO.

CONVEYING MECHANISM.

Application filed July 3, 1919. Serial No. 308,449.

*To all whom it may concern:*

Be it known that AMZI G. RECK, a citizen of the United States, residing at Columbus, in the county of Franklin and State of Ohio, has invented certain new and useful Improvements in Conveying Mechanism, of which the following is a specification.

This invention relates broadly to conveying mechanism, and has particular reference to an improved automatic structure primarily adaptable for use in baking establishments for the purpose of reducing the manual handling of bread or other baking products to a minimum, thus serving to promote sanitation and providing means for expediting production together with an accompanying reduction in labor costs.

The primary object of the invention resides in the provision of conveying mechanism of the above character which is so designed as to receive the baked products immediately upon their delivery from an oven and to conduct the same to a traveling and cooling conveyor upon which the products are deposited, said cooling conveyor being of peculiar construction and embodying a plurality of open frames, whereby through the use of which air may circulate around all sides of the products carried by said frames thus effecting a uniform cooling of the products during their travel along said conveyor, the structure permitting of a thorough and complete cooling of the products so that when discharged from the conveyor said products will be in a suitable condition for wrapping or other general handling.

A further object of the invention resides in the provision of a primary conveyor, which latter being arranged immediately adjacent to an array of baking ovens in order to receive the products of the latter and to conduct the same to the cooling conveyor, and an oscillatory conveyor being mounted between the primary conveyor and the cooling conveyor in order to provide means for distributing the oven products over the full widths of the cooling conveyor, the latter being of an appreciably greater width than the primary conveyor.

Other objects of the invention will be in part obvious and in part pointed out hereinafter.

In the accompanying drawings, forming a part of this specification:

Figure 1 is a diagrammatic view illustrating the arrangement of the several conveyors comprising the present invention, Figure 2 is a top plan view of a portion of the cooling conveyor, and illustrating the relationship of the oscillatory conveyor with respect thereto, Figure 3 is a vertical sectional view taken along the line 3—3 of Figure 2, Figure 4 is a rear elevation of the structure disclosed in Figure 2, Figure 5 is an enlarged transverse sectional view taken through the chain structure of the cooling conveyor, Figure 6 is a fragmentary enlarged side view of the cooling conveyor, and Figure 7 is a fragmentary enlarged plan view of the support.

Referring more particularly to the details of the invention as they are illustrated in the accompanying drawings, an array of baking ovens is indicated by the numeral 1, and extending longitudinally of the ovens and immediately contiguous thereto is a traveling primary conveyor 2. The latter is so positioned that when baked products are withdrawn from the ovens the same may be deposited upon the conveyor and conducted away from the ovens without involving manual handling or touching to any considerable degree. The conveyor 2 may be driven in any suitable manner so that its upper portion will travel in the direction indicated by the arrow B, and upon reaching the end of said conveyor the products will be discharged into a suitable chute 3. Leading out of the chute 3 is a laterally directed cross conveyor 4, which by being provided with transverse flights 5 will enable the products to be conducted in an oblique upward direction, as is indicated by the arrow C. The conveyor 4 terminates in a gravity chute 6 which leads into an oscillatory conveyor 7, which has its fulcrum end constantly positioned beneath the discharge end of the chute 6 so as to be capable of receiving the products discharged from the cross conveyor at any position of angularity which the oscillatory conveyor may assume with respect to the discharge end of the chute 6. Products positioned upon the oscillatory conveyor are conducted in the direction indicated by the arrow D and are discharged upon a relatively broad cooling conveyor 8. The comparative differences in width of the conveyors 4 and 8 necessitate the use of the oscillatory conveyor 7, in order that the baked products may be distributed over substantially the entire width of the cooling conveyor. The specific construction of this cooling conveyor will be hereinafter more fully set forth but at this juncture it is merely sufficient to state that the conveyor 8 is of open work construction, in order that the bread or other products carried thereby may have all of their sides and surfaces exposed to the atmosphere so that a uniform and rapid cooling of the same may be accomplished. The conveyor 8 is adapted to travel at a comparatively slow rate of speed in order to allow the products sufficient time to thoroughly cool; and said conveyor may be of any desired length or actuated at any desired speed in order that the cooling of the products may be fully and accurately governed. To economize in space, and to render the conveying mechanism as a whole comparatively compact, the conveyor 7 is formed so that the same will discharge its products upon a second conveyor 9, which latter is driven to conduct the products in the direction indicated by the arrow E and effects the discharge of the products into a curved and gravity chute 10, which is positioned so that its discharge end is in substantial registration with the fulcrum end of a second oscillatory conveyor 11, the latter being substantially identical in construction and operation as regards the first named oscillatory conveyor 7. The conveyor 11 discharges upon a second cooling conveyor 12 which is identical to the conveyor 8 and is formed to convey the baked products in the direction indicated by the arrow F. Through the use of the second oscillatory conveyor bread carried by the conveyor 9 is distributed over the full width of the conveyor 12. This arrangement prevents grouping of the products and consequently distributes the same to properly spaced cooling positions. The other end of the conveyor 12 terminates in a discharge apron 13 which is positioned to deposit the then cool bread or other baked products upon a transverse conveyor 14, which leads the products in the direction indicated by the arrow G and transfers the same to a discharge conveyor 15 by means of a curved chute 16. Transverse conveyors 17 are located contiguous to the discharge conveyor and by means of which the products may be conducted to a battery of wrapping machines 18 and thence delivered to suitable points for shipment. Through the arrangement of conveyors described, it will be manifest that the products of the ovens 1 are handled to but a very limited extent, and in fact the present arrangement of conveyors the bread is only touched when the same is being transferred from the discharge conveyor 15 into the wrapping machine conveyor 17. Through the arrangement of the cooling conveyors 8 and 12 the bread is permitted to travel for an extended period of time in order that the same may be completely cooled upon reaching the discharge conveyor, and by doubling the cooling conveyors considerable economy is obtained in floor space, but it is obvious that if desired only one of the cooling conveyors need be employed and from this it will be gathered that the arrangement of the cooling conveyors is mainly dependent upon the structural peculiarities of the building in which they are situated. Through the use of the conveying mechanism set forth the necessity of placing the bread by hand into transporting receptacles or trays is eliminated and the use of drying rooms likewise avoided. By enabling the heat of the baked products to dissipate substantially from the time they are discharged from the ovens prevents any single portion or area of the baking establishment from becoming overheated, and this distribution of heat effects a more rapid and uniform cooling of the products. The construction of the cooling conveyors forms an essential part of the present invention. In this instance said conveyors are formed to include a plurality of longitudinally extending guide frames 19, which are preferably formed of metal and are supported in any suitable manner. As shown, the guide frames are adapted to carry at their ends a plurality of journaled shafts upon which the sprocket wheels 20 are fixedly mounted, and these sprocket wheels are arranged to receive the chain structures 21 of said cooling conveyors. In this instance said chain structures each consists of a plurality of articulately connected links 21 which are arranged in pairs, and their adjoining ends are pivotally united by means of transversely extending stud shafts 22. Anti-friction rollers 23 are journaled upon the stud shafts and serve to maintain said links in suitably spaced relation, and said rollers are further arranged to engage with the guide frames 19 so that the movements of the chain structures may be facilitated and economy in applied power obtained. By spacing the links of the chain structure in the manner described, it is possible for the teeth of the sprockets 20 to enter said links and in this manner to effect the movement of said chain structures.

Oppositely disposed pairs of links are arranged to have secured thereto rigid angle clips 24, to which are secured transversely extending angle members 25, the inwardly extending edges of the latter being suitably perforated and designed to receive the hook shaped ends of a plurality of cross wires 26, which constitutes an open work support for the reception of the products delivered to said cooling conveyors. Obviously, the cross wires will efficiently serve to support the products upon said conveyors and at the same time will offer but a minimum of resistance to the circulation of air around all of the surfaces of said products, so that this circulation of air will effect a thorough and uniform cooling of all portions of the products. Owing to the manner in which the cross wires 26 are supported it will be obvious that the links 21 are capable of flexing.

Any suitable mechanism may be employed for operating the conveyors, and in this instance a motor 27 has been illustrated as effecting the movement of the cooling conveyors 8 and 12. To accomplish this said motor 27 may have its shaft equipped with a pinion 28, which is arranged for meshing engagement with an enlarged gear 29, the latter being carried upon a cross shaft 30. One end of this shaft is equipped with a relatively small sprocket over which a drive chain 31 is passed, the latter leading to an enlarged sprocket carried upon one of the shafts for operating the sprocket wheels 20. In this manner it will be noted that the speed of the motor 27 is greatly reduced when its power is transmitted to the cooling conveyor 8, so that the movement of the latter may take place in the required relatively slow manner.

The other end of the shaft 30 is provided with a pinion 32, which meshes with an enlarged gear 33 carried upon a second counter shaft 34. This shaft is also equipped at one end with a small sprocket over which a chain 35 is trained, the latter leading to the drive axle or shaft of the cooling conveyor 12. This arrangement of gearing imparts the requisite slow movement to the conveyor 12. The mechanism for oscillating the conveyors 7 and 11 is substantially identical, and hence a description for one will suffice for the other. Thus, to control the operation of the conveyor 11, the same is formed to include a U shaped frame 36 which is mounted for pivotal movement about a vertical axis which in this instance is in the form of an upstanding shaft 37, the latter being suitably journaled within cross bars 38 forming a part of the frames 19. Connected with the vertical portions of the frame 36 are the sides 39 of the conveyor, and in this instance these sides are equipped with depending bearings in which are journaled rollers 40, the latter being arranged for engagement with an arcuate track 41 connected with one of the cross bars 38. By virtue of this construction the forward projecting end of the conveyor 11 will be suitably supported for swinging movement. Journaled within the sides 39 and extending transversely across the same are a plurality of rolls 42, over which an endless apron 43 is trained, the latter being disposed as to underlie the chute 10 so as to be in a position to receive bread or other material discharged from the latter.

To effect the operation of the apron 43, the counter shaft 34 is equipped with a second sprocket over which is trained a chain 44, which leads to a sprocket located on a short shaft section 45, whereby upon the rotation of the counter shaft motion will be imparted to the shaft section 45. The latter is equipped with a beveled gear 46 which is disposed to mesh with a similar gear 47 carried upon a longitudinally extending shaft 48. This shaft 48 is suitably journaled upon the frame 19 and has its opposite end equipped with a sprocket over which is trained a chain 49, said latter chain leading to a sprocket carried upon a stud shaft 50 which, in turn, is suitably journaled within bearings 51 supported by one of the cross bars 38. The other end of the stud shaft 50, opposite to its power receiving end, is equipped with a beveled gear 52, which meshes with a similar gear 53 carried upon the shaft 37. In this manner the operation of the motor 27 will effect the rotation of the shaft 37. The upper end of the latter is equipped with a beveled gear 54, which meshes with a similar gear 55 carried upon a transversely extending shaft 56, the latter being journaled for rotation within the sides of the U shaped frames 36. One of the ends of the shaft 56 is equipped with a sprocket over which is trained a chain 57, and the latter is also trained over another sprocket carried upon the protruding end 58 of one of the rolls 42. It will thus be seen that through the system of gearing described, motion may be imparted from the motor 27 to the apron 43 and in this manner the discharge of bread from said apron upon the cooling conveyor 12 may be effected.

To continuously operate the conveyor 11 first in one direction and then in the other, the underside of the frame 36 is equipped with a fixed crank arm 59 to the free end of which is connected a link 60, the latter having its opposite end connected with a reciprocatory rod 61, which is mounted in a fixed bearing 62 carried by one of the cross bars 38. The other end of the rod 61 is connected with a pitman 63 which, in turn, has its opposite end connected with the free end of a second crank arm 64. This crank arm is mounted for rotation upon a shaft 65 which also carries a gear 66, the latter being arranged for meshing engagement with a pinion 67 carried upon the shaft 48. Through the construction described, when the motor 27 is in the state of rotation power will be imparted to the cooling conveyors 7, 8 and 12 and also to the apron 43 of the oscillatory conveyor 11; moreover, through the construction set forth the conveyor 11 will be caused to continuously reciprocate so that its discharge end will be constantly positioned over a new portion of the conveyor 12. By virtue of this arrangement it will be manifest that bread or the like will be distributed over the full width of either of the cooling conveyors by the oscillatory structure described and by this manner of placing the bread greater advantage is to be had with regard to its rapidity in cooling.

From the foregoing description taken in connection with the accompanying drawings it will be observed that reliable and effective mechanism has been provided for mechanically handling and cooling oven products and one wherein the parts are so distributed as to take full advantage and overcome the limitations of restricted building areas. Again, through the provision of cooling conveyors the use of portable trays or carriers of common employment in transporting bread from the ovens to shipping points is eliminated and the heat radiated from grouped trays filled with drying bread also precluded. By thus maintaining the bread in atmospheres of relatively low temperatures conditions are rendered more conducive toward an expeditious drying of the baked products. Through the construction described for forming the drying or cooling conveyors a complete circulation of air around all sides of the products deposited thereon is maintained, thus providing a uniform cooling of the bread over all parts thereof. The conveying mechanism is further of such construction as to permit the same to be suspended from the ceiling of the building, and in this manner economy in floor space is produced together with an agreeable elimination of floor congestion. In short, the conveying mechanism provides means for eliminating the manual handling of baked oven products, affords consequent reductions in labor costs and provides means for quickly and thoroughly cooling the products placed thereon.

What I claim is:

1. In a cooling apparatus for bakery products, a pair of spaced stationary rails, a chain movable longitudinally along each of said rails, said chains including a plurality of aligned link sections having pivotally united adjoining ends, bars extending transversely of said chains and having the ends thereof connected with said link sections intermediately of the pivotal connections between the latter, there being a pair of said bars to each pair of adjacent link sections, and a support of open work construction between the inner edges of each pair of said bars and between the pivotal connections of said link sections, said support serving to permit of normal flexing on the part of said chains.

2. In a cooling apparatus for bakery products, a pair of spaced stationary rails, chains movable along said rails and including pivotally connected and longitudinally aligned link sections, pintles uniting the ends of said sections and provided with anti-friction rollers disposed for engagement with said rails, cross bars extending transversely of said chains and connected at their ends with the inner sides of said links, and a support of open work construction between the cross bars of each of the link sections of the chain, said support serving to permit of a free circulation of air around all sides of the products positioned thereon.

In testimony whereof I affix my signature.

AMZI G. RECK.